Oct. 31, 1972 C. KOCH 3,701,582
OPTICAL ATTACHMENT FOR VIEWING A FOCUSING SCREEN OF A CAMERA
Filed Jan. 8, 1971 3 Sheets-Sheet 2
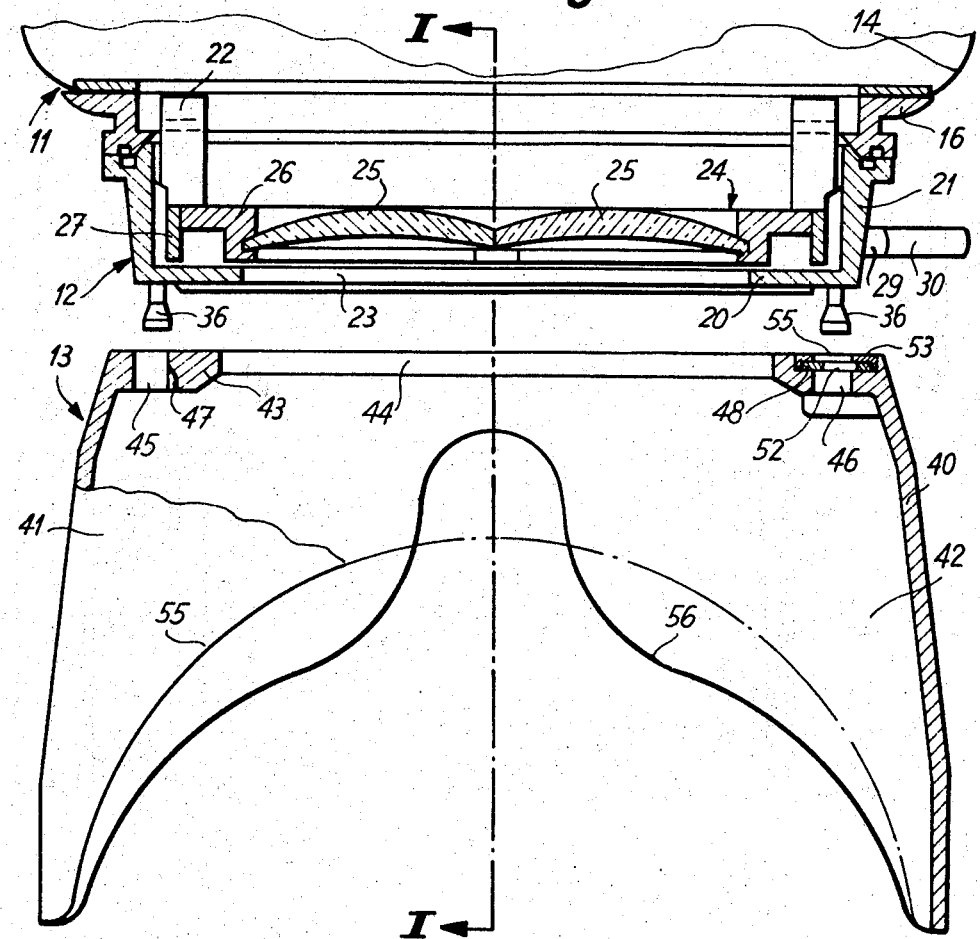
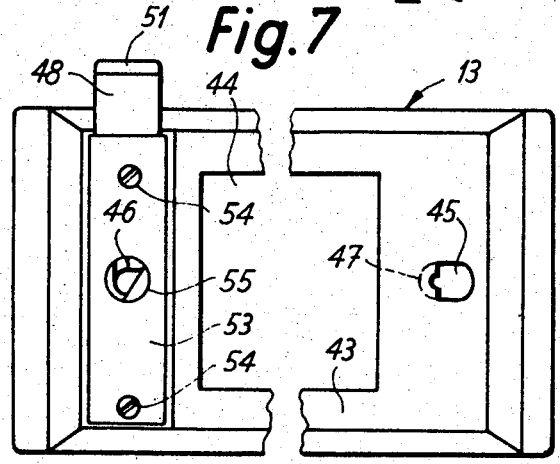
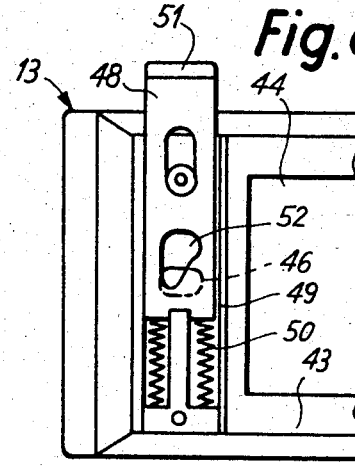
INVENTOR.
Carl Koch
BY
Watson Cole Grindle & Watson
Attys.

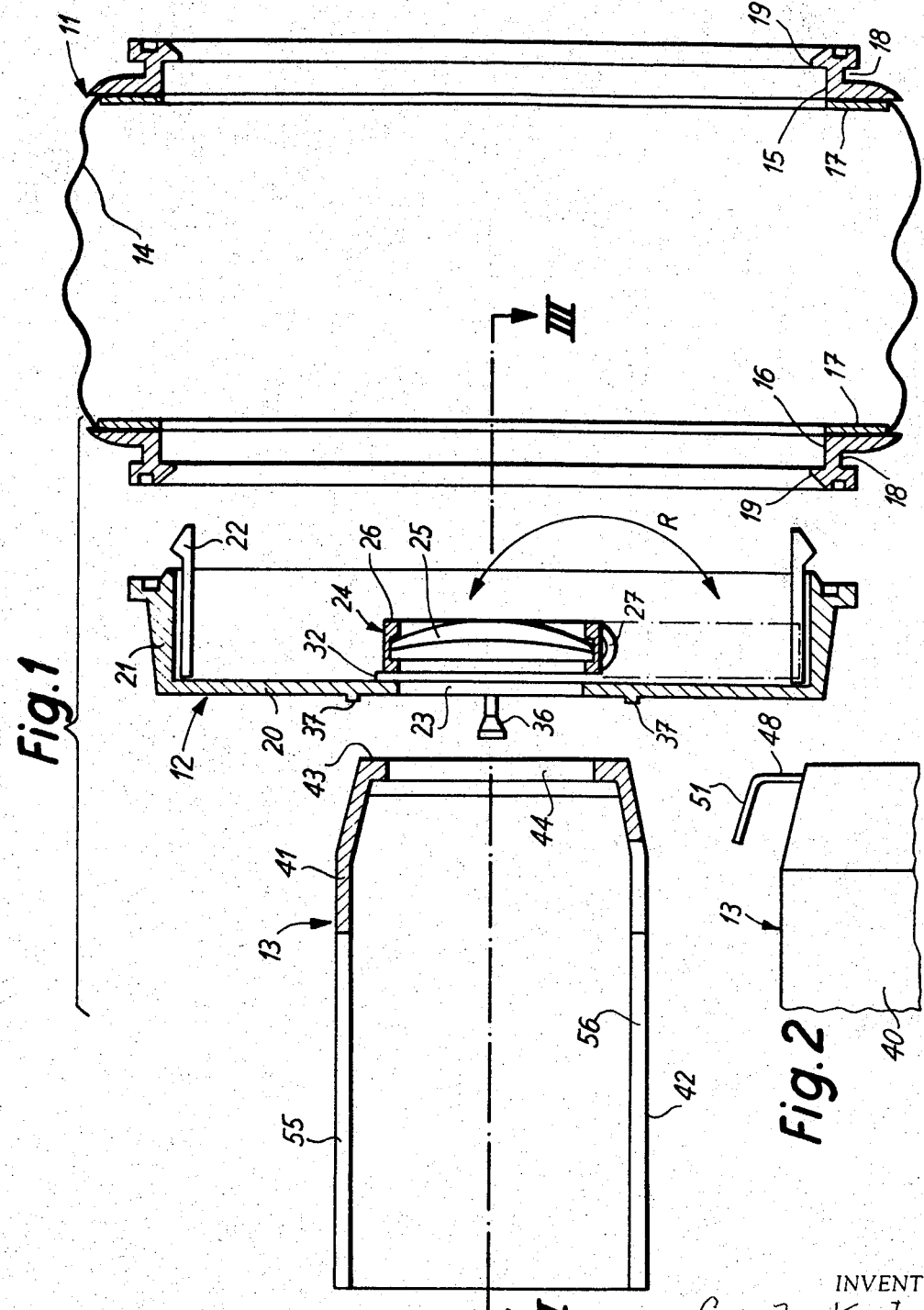

United States Patent Office 3,701,582
Patented Oct. 31, 1972

3,701,582
OPTICAL ATTACHMENT FOR VIEWING A FOCUSING SCREEN OF A CAMERA
Carl Koch, Stetten, Switzerland, assignor to Sinar AG Schaffhausen, Feuerthalen, Switzerland
Filed Jan. 8, 1971, Ser. No. 105,042
Int. Cl. G02b 27/04, 23/18, 23/20
U.S. Cl. 350—145
4 Claims

ABSTRACT OF THE DISCLOSURE

An optical attachment for viewing the focusing screen of a large-size focusing screen camera. The attachment comprises a light-tight bellows structure including a pair of spaced, opposed end frames interconnected by a flexible bellows. One of the frames is adapted to be releasably attached to a focusing screen and a plate having a viewing window therein is mounted on the other frame. A binocular optical magnifying system is mounted on the plate adjacent the viewing window. The binocular system is selectively swingable on the plate between an operative viewing position in front of said window and an inoperative position away from the window. The optical attachment includes an external lever which is operably connected with the binocular system for moving the binocular system between its operative and inoperative positions. The attachment also includes a tunnel-shaped shield having spaced, opposed open ends. One of the ends of the shield being releasably secured to the plate in surrounding relationship to the window and the other end being shaped to complementally accommodate the head of a photographer. The bellows is relatively self-supporting and laterally and longitudinally flexible to allow both perpendicular and parallel movement of the plate and the shield relative to the focusing screen.

---

This invention relates to an optical attachment for viewing the focusing screen of a large size focusing screen camera, particularly a multi-purpose professional camera.

Different principles are involved when viewing a large focusing screen image as compared with viewing a small focusing screen, such as are usual in amateur or semi-professional cameras, the screen size of which has a maximum of about 6 x 6 cm. Moreover, amateur cameras with focusing screens are almost exclusively mirror reflex cameras of rigid construction, that is lacking any displaceable or pivotable rear wall or optics. Whereas with the smaller focusing screens, almost the entire image can be viewed at a normal viewing distance by the photographer, this is not the case with a large focusing screen unless the viewing distance is increased. However, this latter is undesirable, since viewing of the screen at long range makes it difficult to achieve a precise sharp focusing. Furthermore, in large-size cameras, the objective lens is usually arranged to be both adjustable and pivotable about its axis, which means that the focusing screen image must often be focused in the marginal screen areas where the light beams are strongly divergent.

Both the large focusing screen image and the diverging light beams require the image to be "scanned" by the eye. This understandably adversely affects the focusing process considerably, especially when it is considered that with such cameras the focusing screen image must often be focused with relatively small apertures of the objective. Converging lenses which, in a flat form, can be used as Fresnel lenses therefore represent an important improvement in large-size cameras. Although this can reduce the aforesaid difficulties, it will not completely remove them, since the Fresnel lens unfortunately makes precise sharp focusing more difficult in the event of an extremely shifted or tilted camera back and/or objective and therefore often is not used.

The problem of keeping out extraneous ambient light is present to a much greater degree with a large-size focusing screen than with a small one. The well-known black cloth is awkward and does not permit swift action. As a replacement for the black cloth, light tunnels are known which generally take the form of folding tubes fitted to the back of the focusing screen. Such light tunnels are not deep enough, as a rule, to offer sufficient protection against the intrusion of ambient light. Since when keeping a normal viewing distance from the focusing screen, the eye is usually a considerable distance away from the light tunnel, it is influenced by the ambient light and the pupil contracts, with the result that the focusing screen image appears less bright. If, in order to avoid this disadvantage, the head and eye are moved closer to the focusing screen, a magnifying lens is required in the light tunnel and viewing the focusing screen through such a centrally mounted magnifying lens has the disadvantage that the divergent marginal rays must be viewed more or less centrally. This results in a distinct drop in brightness at the marginal areas of the large size focusing screen and makes focusing of the image very difficult if not impossible, and Fresnel lenses can only partly overcome this problem. Finally, the use of viewing bellows, both with and without magnifying lenses, is known as a replacement for the black cloth, the bellows being fitted behind the focusing screen. Such bellows are effectively a movable light tunnel which permits a better "scanning" of the focusing screen image by the eye, particularly if a magnifying lens is used. Since the magnifying lens only permits monocular viewing and the other eye of the photographer is usually unprotected and is affected by the ambient light, the optimum viewing conditions are not achieved. If one then wants to view the entire image at once, the magnifying lens must be removed, and this gives rise to the same disadvantage as with a rigid light tunnel without any magnifying lens. When changing from viewing with a magnifying lens to viewing without the lens, the eye has to adapt itself to the change in conditions and this again has an unfavorable effect. All known systems and devices for viewing the focusing screen of a large focusing screen camera therefore have certain disadvantages.

It is an object of the present invention to avoid the aforesaid problems and to provide an optical attachment which enables a large focusing screen to be viewed with both eyes and substantially without any extraneous light falling on the screen, either with or without a magnifiying optical system. The invention is based on the knowledge that, due to the lateral spacing of the two eyes, a better simultaneous sight over the full horizontal width of the focusing screen is possible; an increased brightness at the lateral edges of the focusing screen image can be seen because the light beams diverging in the horizontal plane are almost completely picked up by the eyes; and finally, a further, partly subjective, increase in the brightness of the focusing screen image is noticeable wtih binocular vision and if extraneous light is not allowed to affect the second eye.

It is therefore an object of the invention to provide an optical attachment for viewing the focusing screen of a large-size focusing screen camera, comprising a light-tight bellows attachable to the back of the focusing screen, and a binocular optical magnifying system which is mounted on or adjacent to a plate which has a rectangular viewing window therein and is arranged to be secured at the rear end of the bellows, said binocular system being mounted so that it can be moved selectively between an operative or effective position in said window and an inoperative position.

In a preferred embodiment of the invention, the binocular system is pivotally mounted on the side of the plate facing the interior of the bellows and can be pivoted by an externally operated trigger between the effective and the inoperative positions.

Preferably, the attachment includes a light-excluding tunnel element arranged to be secured to the rear of said plate, said plate having locking means on the side thereof remote from the bellows for detachable connection with said light-excluding tunnel, and said tunnel having curved cut-outs in the walls thereof to partly accommodate the head of a photographer.

With this optical attachment, a large focusing screen image can be scanned substantially with only an upward and downward movement of the head and eyes, since the horizontal width of the focusing screen is viewed all at once as a result of the binocular vision. To change from viewing with a magnifying lens for the sharp focusing of the image to overall viewing of the focusing screen without a magnifying lens, or vice-versa, it is only necessary to pivot the binocular magnifying lens into the desired position and to move the plate at the rear end of the bellows to the correct viewing distance from the screen, both of which operations can be carried out without having to take one's eyes away from the viewing window or the plate. Thus, no change in the accommodation of the eyes is necessary during the change-over and the bellows and the plate effectively protect the focusing screen from the intrusion of extraneous light. If, in addition, the aforesaid light-excluding tunnel is secured to the plate, the eyes of the photographer are fully protected from the influence of the ambient light, so that even under unfavorable light conditions, the best possible conditions for viewing the focusing screen are still obtained.

In order that the invention may be fully understood a preferred embodiment of the optical attachment in accordance with the invention will now be described by way of example and with reference to the accompanying drawings, in which:

FIG. 1 is a vertical longitudinal and exploded sectional view through the entire attachment taken along the line I—I of FIG. 3 in the direction of the arrows;

FIG. 2 is a partial side view of one of the structural components seen in the same direction as in FIG. 1;

FIG. 3 is a horizontal longitudinal sectional view taken along the line III—III of FIG. 1 in the direction of the arrows wherein two of the structural components are shown secured together, and the third is shown spaced therefrom;

FIG. 7 is a side view of the left-hand unit of FIG. 1, viewed from the right; and FIG. 8 is a view similar to FIG. 7, but partly cut away.

Figure 4:
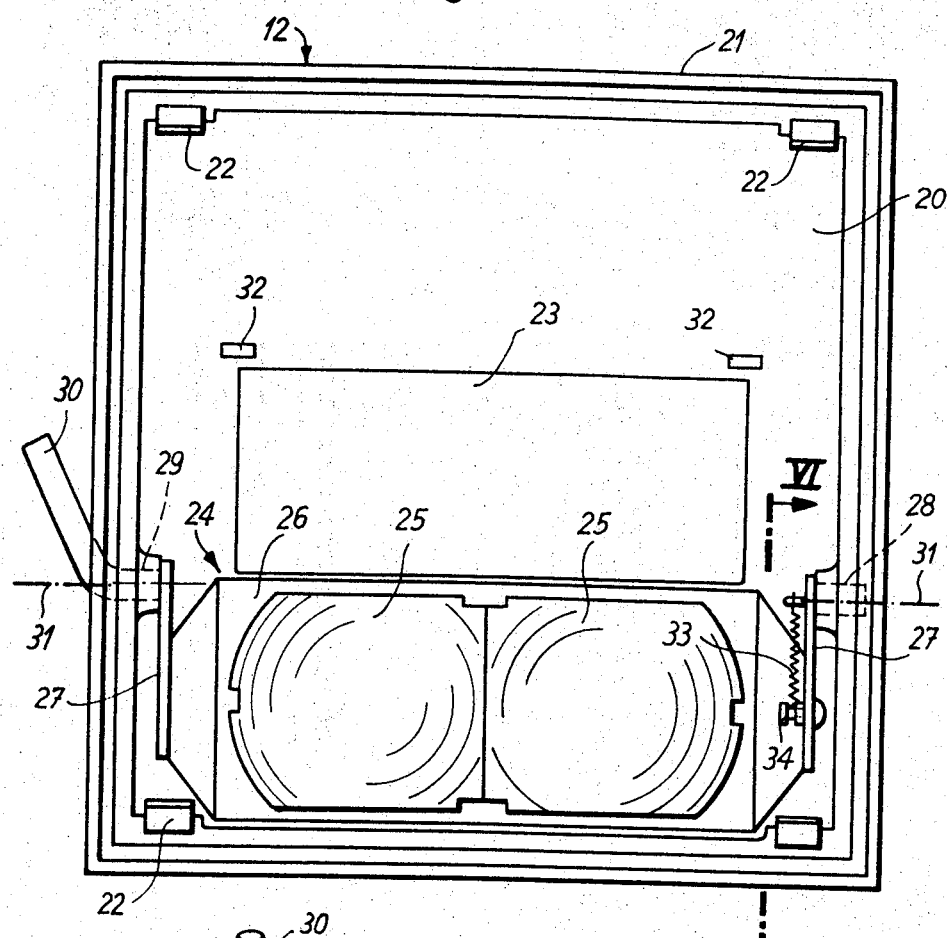
FIG. 4 is an elevational view of the middle structural component seen from the right of FIG. 1 but with the binocular magnifying lens having a different position as compared with FIG. 1.

The optical attachment illustrated in the drawings for viewing the focusing screen of a large-size focusing screen camera consists of three structural components 11, 12 and 13 which are designed to be detachably connected with each other, as will be described in detail. The first structural component 11 is a light-tight bellows which for the most part comprises a tunnel-like wall 14 of flexible opaque material, such as for example an impregnated fabric. Each end part of the tunnel-like wall 14 is connected in light-tight manner with a connecting frame 15 and 16 by clamping the relevant end of the wall 14 between the frame 15 and 16 and a holder 17 connected therewith, as shown in FIG. 1. The two connecting frames 15 and 16 are of identical design and may, for example, be square. Each connecting frame 15 and 16 is provided with an external peripheral groove 18 and an inwardly projecting peripheral rib 19. The frame 15 is intended to be detachably secured to the rear wall of the large-size camera (not shown) behind the focusing screen thereof and for this purpose, the rear wall of the camera or the frame of the focusing screen has suitable locking means which, for example, can be brought into engagement with the groove 18 of the connecting frame 15. The other frame 16 of the light-tight bellows 11 is designed for detachable connection with the second structural component 12 of the attachment.

The structural component 12 has an end wall 20 which is provided with a collar-like peripheral edge or flange 21 which is formed so that it can be brought into suitable abutting relationship with the connecting frame 16 of the bellows 11, as shown in FIG. 3. A number of resilient flexible locking tongues 22 are secured to the inside of the collar 21 and each have at their free end a thickened head with an inclined contact surface, as is clearly shown in FIG. 1. The tongues 22 are designed to engage with the inwardly projecting peripheral rib 19 of the connecting frame 16 in order to secure the structural component 12 to the rear end of the bellows 11. In the center of the end wall 20 is a rectangular viewing window 23 (FIGS. 1, 3 and 4), the longer dimension of which extends horizontally in the usual operative position of the attachment.

Figure 5:
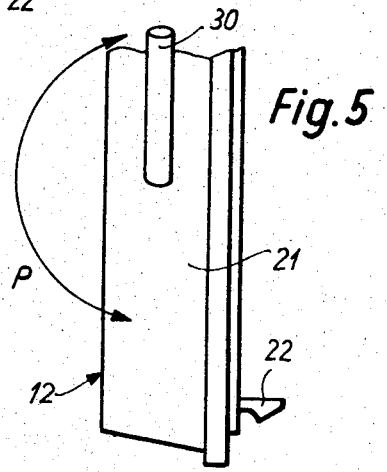
FIG. 5 is a partial side view looking from the left of FIG. 4.

On the side of the end wall 20 facing the bellows 11, that is within the collar 21, is a binocular lens pair 24 consisting of two side-by-side converging lenses 25, the total area of which agrees approximately with the area of the viewing window 23. The lenses 25 are held in a frame 26 of substantially rectangular shape. An arm 27 is attached to each narrow end of the frame 26, and each arm is pivotally mounted on the collar 21 of the end wall 20. One arm 27 is, as shown in FIG. 4, rigidly connected to a short stub shaft 28 which is rotatably set in a suitable bore of the flank of the collar 21, shown on the right of FIG. 4. The other arm 27 is rigidly connected, in a similar way, to a shaft 29 which passes through a bearing bore in the opposite flank of the collar 21 and is bent externally of the collar 21 to form a handle 30, as shown in FIGS. 4 and 5. The pivotal axis 31, FIG. 4, of the two arms 27 which is defined by the shafts 28 and 29 extends parallel to a longitudinal edge of the viewing window 23. The entire binocular lens pair 24 is pivotable about the said axis 31 in the direction of arrow R in FIG. 1 through an angle of about 180° by moving the handle 30 in the direction of the arrow P in FIG. 5. In one terminal position, the lens pair 24 is located in the operative position, namely directly in front of the viewing window 23, as shown in FIGS. 1 and 3. In the other, inoperative, terminal position, the lens pair 24 is pivoted down from the window 23 and rests against a part of the side of the end wall 20 facing the bellows 11, as shown in FIG. 4 and clearly indicated in FIG. 1 by chain-dotted lines. The above-mentioned operative position of the magnifying lens pair 24 is determined by two lugs 32 on the end wall 20.

Figure 6:
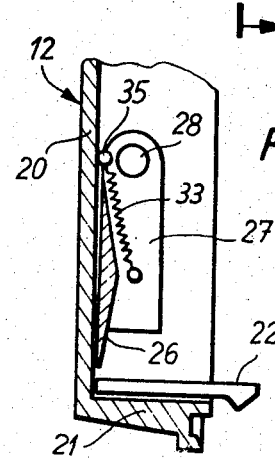
FIG. 6 is a partial sectional view taken along the line VI—VI of FIG. 4.

In order to retain the magnifying lens pair 24 both in its normal position in front of the viewing window 23 and in its inoperative position, a tension spring 33 (FIGS. 4 and 6) is provided which at its one end engages with a bolt 34 on one of the arms 27 and at its other end engages with an eyelet 35 which is secured to the end wall 20 and is located eccentrically of the axis 31, as shown in FIG. 6. The pulling action of the spring 33 endeavors to move the binocular magnifying lens pair 24 into either one or the other pivoted position and to secure it therein.

The end wall 20 has at its side remote from the bellows 11 locking means 36 and 37 providing a detachable connection with the third structural component 13. The locking means include two spaced parallel locking bolts 36 (FIGS. 1 and 3), each having a head which widens in a tapering manner towards the free end of the bolt, and two spaced parallel ribs 37. The viewing window 23 is arranged both between the two locking bolts 36 and also between the two ribs 37.

The third structural component 13 is a rigid light-excluding tunnel with two slightly diverging side walls 40, an upper wall 41, and a lower wall 42. The end of the tunnel 13 facing the lens component 12 has an end wall 43 which is provided with a rectangular window 44 which is designed to be at least as large as the viewing window 23 of the lens component 12. The end wall 43 also includes, as shown in FIGS. 3, 7 and 8, two holes 45 and 46 therethrough which receive the locking bolts 36 of the lens unit 12. One of the holes 45 includes a concave segmental spherical seat 47 (FIGS. 3 and 7) which co-operates with the conical head of one of the locking bolts 36. A slide plate 48 is displaceably mounted in a groove 49 in the end wall 43 in the region of the other hole 46. The slide plate 48 is controlled by compression springs 50 (FIG. 8) and has at its upper end, projecting out of the groove 49, an angled trigger catch 51 (FIGS. 2, 7 and 8) which permits the slide plate 48 to be moved against the force of the springs 50. Furthermore, the slide plate 48 is provided with an aperture 52 therethrough which is not circular but narrows towards the end of the slide plate with which the springs 50 engage, and which in particular has one edge extending at an angle to the direction of movement of the slide plate, as shown in FIG. 8. The aperture 52 and the hole 46 overlap at least partially. The groove 49 is covered by a cover plate 53, which is shown in FIGS. 3 and 7 but for reasons of clarity is omitted from FIG. 8, in order to prevent the slide plate 48 and the springs 50 from falling out. The cover plate 53 is secured by means of screws 54 and has an aperture 55 which is in register with the hole 46. By pressing on the catch 51 the slide plate 48 can be brought into such a position that the wider part of the aperture 52 lies between the hole 46 and the aperture 55 and thus the head of the locking bolt 36 can be inserted into the hole 46. If the catch 51 is then released, the springs 50 force the slide plate 48 back, and the aforesaid inclined edge of the aperture 52 engages and clamps the inserted bolt 36. The entire light-excluding tunnel 13 is thereby displaced sidewards in relation to the lens unit 12 to a certain extent, so that the head of the second locking bolt 36 is pressed against the seat 47 of the associated hole 45. Moreover, the end wall 43 is so dimensioned that it can be fitted conveniently between the two ribs 37 on the end wall 20 of the lens unit 12.

The upper wall 41 of the light-excluding tunnel 13 is provided at the rear, that is at the end remote from the end wall 43, with a semi-circular cut-out 55 which is intended to accommodate the forehead of the photographer. In a similar way the lower wall 42 of the tunnel 13 is provided with a curved cut-out 56 which is intended to partly accommodate the nose and cheeks of the photographer.

The method of using the optical attachment described above for viewing the focusing screen of a large-size focusing screen camera is as follows.

It is assumed that the three structural components 11, 12 and 13 are joined together as described above. The connecting frame 15 at the front end of the bellows 11 remote from the lens unit 12 is connected with the back of the focusing screen camera in the manner likewise described above. The photographer can then view the focusing screen of the camera by placing his head in the cut-outs 55 and 56 of the light-excluding tunnel 13 and pressing his head gently against the tunnel 13. Both eyes of the photographer are thereby protected against extraneous light and are in such a position that the photographer can look with both eyes through the tunnel window 44 and the viewing window 23 at the focusing screen. The bellows 11 and the end wall 20 of the lens unit prevent troublesome external light from falling on to the focusing screen, with the result that the image appears clear and bright. In order to view the whole image, the binocular magnifying lens pair 24 is pivoted down away from the viewing window 23 and into its ineffective position. By moving the head and the structural components 12 and 13 up and down, the focusing screen image can be scanned over its full height. In the horizontal sense, the image can be viewed over its full width without any trouble as a result of viewing with both eyes. In extreme cases, for example with a very wide focusing screen, the image can still be scanned in the horizontal direction by moving the head and the structural components 12 and 13 sideways. If one wishes to see details of the focusing screen image more clearly, for example for the purpose of sharp focusing, the binocular magnifying lens pair 24 can be pivoted into its operative position directly in front of the viewing window 23 by suitable actuation of the handle 30 without having to take one's head away from the tunnel 13. One has then only to choose the correct viewing distance from the focusing screen by moving the structural components 12 and 13 correspondingly nearer to the focusing screen. This is easily possible owing to the flexibility of the tunnel-like wall 14 of the bellows 11.

Changing from viewing without the magnifying lens to viewing with the lens does not mean that it is necessary to adapt the eyes to different light conditions, since almost all external light is kept away from the region of the eyes. Furthermore, when viewing the focusing screen with the binocular magnifying lens, only comparatively slight movements of the eyes, and possibly of the head and the units 12 and 13, are necessary in order to be able to scan the entire image. The binocular viewing by means of the magnifying lens pair 24 moreover produces a heightened impression of brightness as compared with monocular viewing. This effect is partly subjective and partly due to the fact that neither of the eyes is influenced by ambient light. Furthermore, increased brightness of the focusing screen image arises due to the fact that when viewing with both eyes the light beams which diverge horizontally are almost completely detected within the ocular distance and thus the horizontal drop in light intensity towards the marginal parts of the image is substantially less than in the case of monocular viewing.

The light-excluding tunnel 13 can be removed easily by pressing the catch 51 of the slide plate 48 and by then withdrawing the locking bolt 36 of the lens unit 12. The two remaining units 11 and 12 can then be used in the same way as already described above, but in this case the photographer looks with both eyes directly into the viewing window 23 of the lens unit end wall 20. Even though in this case the eyes are not protected against the intrusion of ambient light as well as when using the light-excluding tunnel 13, the focusing screen can often be viewed sufficiently well with only the two units 11 and 12, and in any case, better than with the previously known devices which only have a monocular magnifying lens at the rear end of the light-tight bellows. Omitting the light-excluding tunnel 13 has the advantage that the attachment takes up less room when being transported.

In a modified form, which is not illustrated, instead of the aforementioned simple binocular lens pair 24, a binocular prismatic system may be used which causes image inversion so that the image, which is normally viewed upside down, can now be viewed right side up. According to a further modification, the binocular magnifying lens pair can be moved between its normal position and its inoperative position by a sliding movement rather than a pivotal movement.

I claim:

1. An optical attachment for viewing the focusing screen of a large-size focusing screen camera comprising:
   a light-tight bellows structure including a pair of opposed spaced end frames and a flexible bellows interconnecting said frames, one of said frames having means for releasable attachment to the back of a focusing screen;

a plate having a viewing window therein mounted on the other of said frames;

a binocular optical magnifying system mounted on said plate adjacent said window, said binocular system being selectively movable on the plate between an operative viewing position in front of said window and an inoperative position away from said window;

an external trigger means operatively connected with said binocular system for moving the latter between its operative and inoperative positions; and a tunnel-shaped shield having spaced, opposed open ends, one of said ends being relasably secured to said plate in surrounding relationship to said window, and the other of said ends being shaped to complementally accommodate the head of a photographer, said bellows being relatively self-supporting and laterally and longitudinally flexible to allow both perpendicular and parallel movement of said plate and shield relative to the focusing screen.

2. An optical attachment as set forth in claim 1, said window being rectangular, said binocular system being pivotable about an axis extending parallel to a longitudinal edge of said rectangular window through an arc of about 180° between said operative and inoperative positions.

3. An optical attachment as set forth in claim 2, there being provided an over center spring means attached between said plate and said binocular system to secure the latter under the bias of said spring means in both its operative viewing position and in its inoperative position.

4. An optical attachment as set forth in claim 1, said plate including a peripheral collar, there being included means releasably attaching said collar to said other end frame of the bellows structure.

References Cited
UNITED STATES PATENTS

| | | | |
|---|---|---|---|
| 2,926,580 | 3/1960 | Knauf | 350—145 X |
| 922,411 | 5/1909 | Folmer | 95—47 |
| 2,625,855 | 1/1953 | Gaylor | 350—57 X |
| 2,833,191 | 5/1958 | Weiss | 95—47 X |
| 1,606,702 | 11/1926 | Hertzler | 350—238 |
| 699,767 | 5/1902 | Saxby | 95—44 R |
| 3,572,905 | 3/1971 | Schlapp et al. | 350—58 |

DAVID SCHONBERG, Primary Examiner

P. A. SACHER, Assistant Examiner

U.S. Cl. X.R.

95—47; 350—57